United States Patent [19]

Vermon et al.

[11] Patent Number: 5,800,187

[45] Date of Patent: Sep. 1, 1998

[54] CONNECTION STRIP FOR HIGH DATA RATE LINES, AND A RESULTING CONNECTION ASSEMBLY

[75] Inventors: Virginie Vermon, Sedan; Fabrice Audeval, Charleville Meziere, both of France

[73] Assignee: Alcatel Cable Interface, Vrigne Aux Bois, France

[21] Appl. No.: 617,631

[22] Filed: Mar. 19, 1996

[30] Foreign Application Priority Data

Mar. 20, 1995 [FR] France .................. 95 03209

[51] Int. Cl.⁶ .................................. H01R 13/648
[52] U.S. Cl. ........................... 439/92; 439/716
[58] Field of Search ............... 439/92, 709, 712–16

[56] References Cited

U.S. PATENT DOCUMENTS

| | | |
|---|---|---|
| 4,541,682 | 9/1985 | Gerke et al. . |
| 4,866,575 | 9/1989 | Mickelson et al. .................. 361/426 |
| 4,907,263 | 3/1990 | Neuwirth .......................... 379/326 |
| 4,986,768 | 1/1991 | Bramkamp et al. ................. 439/709 |
| 5,000,703 | 3/1991 | Biederstedt et al. ................ 439/92 |
| 5,356,309 | 10/1994 | Carney et al. ..................... 439/532 |

FOREIGN PATENT DOCUMENTS

| | | |
|---|---|---|
| 27 29 269 A1 | 11/1978 | Germany . |
| 39 02575 C1 | 3/1990 | Germany . |
| WO 92/08255 | 5/1992 | WIPO . |

Primary Examiner—Khiem Nguyen
Assistant Examiner—Eugene G. Byrd
Attorney, Agent, or Firm—Sughrue, Mion, Zinn, Macpeak & Seas, PLLC

[57] ABSTRACT

A connection strip for high data rate lines includes an elongate insulating body and two rows of successive sets of insulation-displacement contacts mounted in the body so that they face one another. The connection strip includes a single one of the end contacts of each set, assigned to constituting a grounding screen referred to as a grounding contact in the set, and a grounding collector connected to an external ground, and provided with tongues connected to the various grounding contacts inside said body. Application to connecting 100 Mhz lines.

25 Claims, 7 Drawing Sheets

CONNECTION STRIP FOR HIGH DATA RATE LINES, AND A RESULTING CONNECTION ASSEMBLY

The present invention relates to a connection strip for high data rate lines, in particular telecommunications or data transmission lines, for which it is necessary to limit crosstalk between lines connected to the strip. The present invention also relates to a resulting connection assembly constituted by connection strips installed on a frame.

BACKGROUND OF THE INVENTION

Each such line includes a set, e.g. one or more pairs, of individually insulated conductors. Such lines may be screened, and each of them then further includes a screen wire. They may also be part of a cable, which is itself screened. In particular, they may be 100 MHz lines.

The connection strip is of the type including an elongate insulating body and two rows of insulation-displacement contacts mounted in the body so that they face one another from one row to the other and are interconnected electrically inside the body. The connection strip either connects inlet lines to outlet lines, or else it connects inlet or outlet lines to cross-connection jumpers, each of which includes the same number of conductors as each of the lines. Successive sets of insulation-displacement contacts in each row receive the conductors from the lines or from the jumpers.

Generally, crosstalk between adjacent lines on the connection strip is limited by spacing apart the sets of insulation-displacement contacts or by associating grounding screens with the sets of insulation-displacement contacts in each row.

Document U.S. Pat. No. 5,000,703 describes a connection strip for screened lines, the connection strip including an insulating body, at least one row of insulation-displacement contacts mounted at uniform pitch inside the body, and screen connection elements connected to some of the insulation-displacement contacts in each row. Each of the screen connection elements is a channel-section conductive part. Its two flanges are spaced apart from each other by a distance of not less than twice the pitch of the insulation-displacement contacts in their respective row, and said flanges are inserted in two of the corresponding contacts of the row. The web of the conductive part extends over the outside of the body parallel to the row of insulation-displacement contacts, when the flanges are inserted in two insulation-displacement contacts, and it includes a connection contact for connecting to the screen wire of one of the lines. When each of the screened lines includes a pair of conductors and a screen wire, each row has a corresponding set of four insulation-displacement contacts for each line, the two end insulation-displacement contacts in the set receiving the two flanges of one of the screen connection elements, and the two inner insulation-displacement contacts in the set receiving the two conductors of the line that has its screen wire connected to the connection element that flanks them.

For each line, that connection strip has insulation-displacement contacts for the conductors of the line, a screen connection element, and two additional insulation-displacement contacts. The additional contacts in the sets of contacts constitute grounding screens when the line is screened, and when its screen wire is connected to the screen connection elements. Under these conditions, that connection strip reduces crosstalk between the lines satisfactorily, but it is relatively large and expensive.

OBJECTS AND SUMMARY OF THE INVENTION

An object of the present invention is to minimize crosstalk between lines connected to a connection strip, without it being necessary for the lines to be screened lines, and while minimizing the cost and the dimensions of the connection strip. Another object of the present invention is to implement a compact assembly of such connection strips.

The present invention provides a connection strip for high data rate lines, the connection strip including an elongate insulating body and two rows of insulation-displacement contacts mounted in the body so that they face one another, are interconnected electrically in pairs from one row to the other, and define successive sets along each row, the contacts of each set in one of the rows being assigned to one of the lines and to constituting at least one end grounding screen in the set, wherein, in each set of contacts, said connection strip includes a single one of the two end contacts assigned to constituting a single grounding screen referred to as a grounding contact, and a grounding collector retained along said body, connected to an external ground, and provided with tongues for making electrical connection with the facing grounding contacts in the two rows, inside said body.

The connection strip advantageously further has at least one of the following additional characteristics:

said insulation-displacement contacts mounted in the body have a first pitch between them in each set, and a second pitch, that is greater than the first pitch, from one of the sets to the next in each row;

said insulation-displacement contacts are mounted along each row so that they slant or are perpendicular relative to their row, at least in a "front" portion of said body, with said first pitch having a value less than 5 mm, and said second pitch having a value of about 5 mm;

said insulating body includes an elongate channel-section cradle having a web and two side flanges, and receiving connection modules, each module being formed of a rectangular insulating block equipped with two sets of facing contacts;

each of said insulation-displacement contacts includes a "front" first portion that is of substantially Z-shaped cross-section and that is axially split, or that is a channel-section portion and that is laterally split between the web and the side flanges of its channel section, and an opposite "rear" second portion coupled to a resilient side tail projecting from one side of the first portion only, the two side tails of two contacts in place in the facing recesses bearing resiliently against each other in the rear central portion of each connection module, while clamping one of the tongues of the grounding collector between them when the two contacts are grounding contacts; and the connection strip further includes at least one hinge bracket and at least one opposite locking catch, said hinge bracket and said locking catch projecting from the rear of the web of the cradle, substantially at respective ones of its ends, so as to hold the connection strip in a frame connected to the external ground.

The present invention also provides an assembly of such connection strips, the assembly being formed on the frame connected to the external ground, and the frame being a channel-section frame and comprising a web and two flanges, wherein said assembly includes a hinge part removably mounted on the edge of a first one of the flanges of the frame, and wherein the second flange of the frame is provided with locking notches for said connection strips.

Advantageously, in addition:

the hinge part includes a flat elongate support carrying retaining catches projecting from a first one of the faces of the support, each of which catches is provided with a fastening end tooth, the flat elongate support also carrying at least one support arm projecting from the second face of the support and provided with two opposite hinge fingers, said fingers being parallel to the middle axis of said support, and the first flange of the frame is provided with slots along its own edge for receiving the teeth of the various retaining catches.

BRIEF DESCRIPTION OF THE DRAWINGS

The characteristics and advantages of the present invention appear from the following description of an embodiment given with reference to the accompanying drawings, in which.

MORE DETAILED DESCRIPTION

Figure 1:
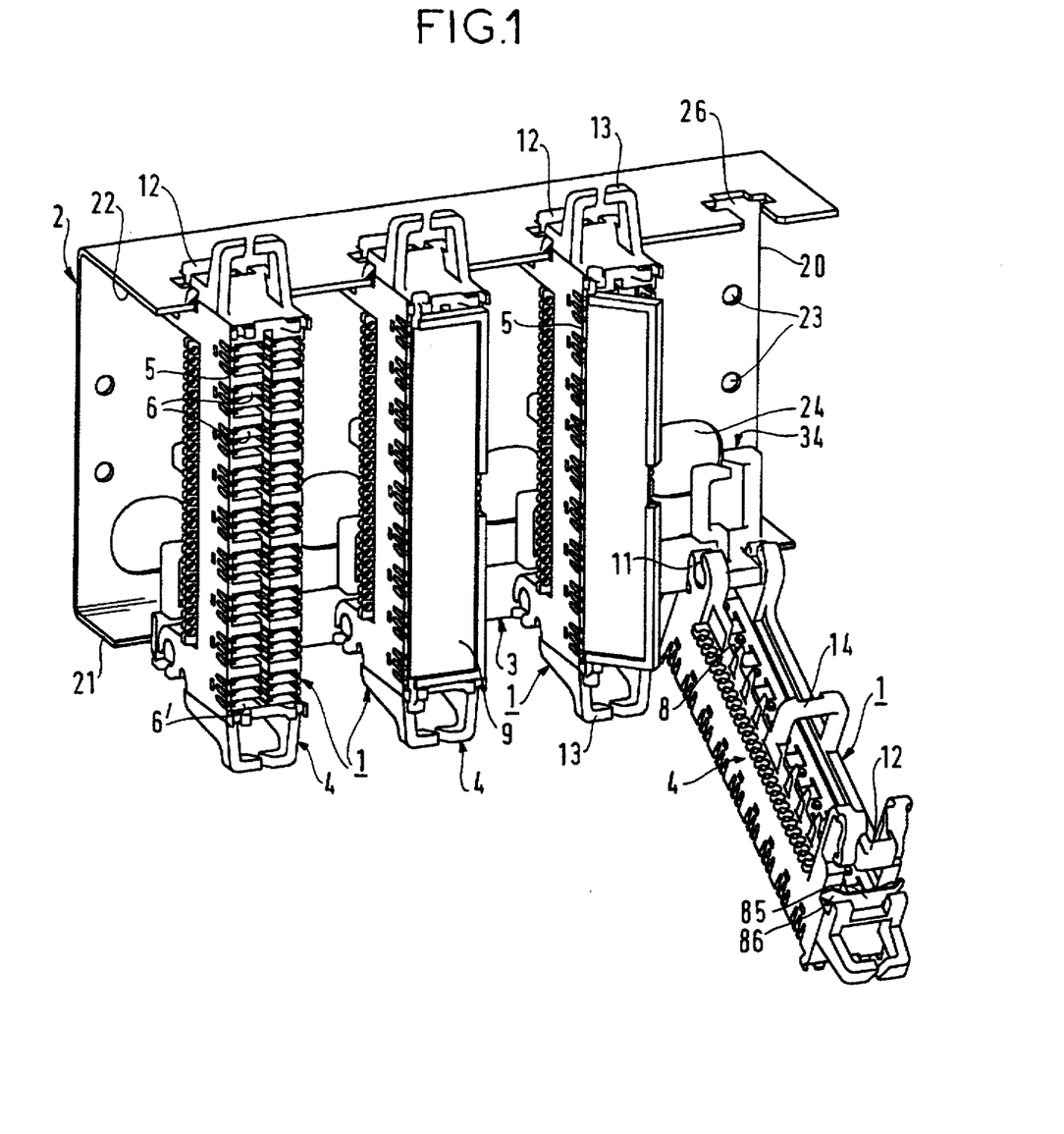
FIG. 1 is a perspective view of an assembly of connection strips implemented on a frame and in accordance with the invention.

FIG. 1 shows an assembly of four connection strips 1 of the invention, which assembly is formed by installing the connection strips side-by-side on a channel-section metal frame 2. The assembly is shown vertical, the connection strips being disposed vertically between the horizontal flanges of the frame. The assembly may be horizontal, with the connection strips being disposed horizontally between the vertical flanges of the frame which is then vertical or horizontal. The assembly can be mounted in a box or cabinet, or on a support structure. Such elements are not shown and they are equipped to fix the frame such that the connection strips are in the desired positions.

The connection strips 1 are individually hinged and locked on the frame, so that each of them can be installed or removed, and can be put in the "open" position or in the "closed" position on the frame.

The frame is adapted to receiving a given number of connection strips, which given number may be different from four. The frame may be under-equipped. It is connected to an external ground.

A hinge part 3 which is common to the various connection strips (it being understood that an individual hinge part may equally well be assigned to each of them) is retained removably on the frame, on one of the flanges thereof.

FIG. 1 shows the connection strips equipped to various extents, and one of them is shown in the open position on the frame, to facilitate understanding. They are identical to one another. Each of them essentially comprises:

an elongate insulating body 4 which preferably comprises a support cradle 5 which may be in one piece, or in which connection modules 6 and an end module 6' are installed;

insulation-displacement contacts (not shown to avoid cluttering, and referenced 7 below) substantially flush with a "front" one of the faces of the strip as considered vertical, which contacts are disposed in two rows inside the body, and are more precisely installed in the modules 6 and 6', the module 6' being of the same dimensions as the modules 6 but being under equipped relative thereto;

a grounding collector 8 retained on the rear face of the body 4; and a cover 9 mounted on the front face of the insulating body 4.

Each connection strip further comprises:

a pair of hinge brackets 11 projecting from the rear face of the insulating body, at one of its ends, which brackets are snap-fastenable to the hinge part 3;

locking catches 12 projecting from the rear face of the insulating body, at its other end, which catches lock resiliently onto the frame 2;

two wire-receiving end rings 13 which are provided at respective ends of the insulating body 4; and at least one wire-receiving rear ring 14 which is analogous to each end ring 13, but which projects from the rear face of the insulating body 4, and in this example from the middle portion of the rear face.

When installed and closed on the frame 2, the connection strips leave an empty gap inside the frame. This gap constitutes a bed for the lines to be connected to the connection strips.

Figure 2:
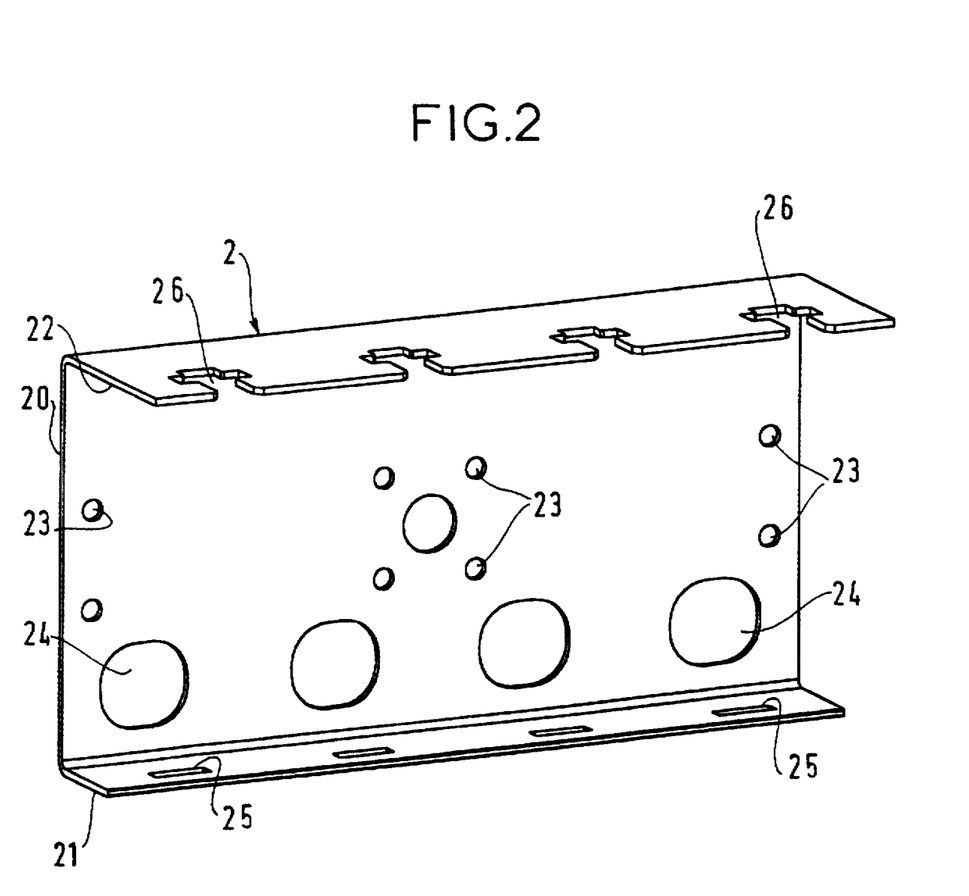
FIG. 2 is a perspective view of the frame.

The frame 2 is shown in FIG. 1, and in more detail in FIG. 2. It is shown vertical for receiving the connection strips vertically. It comprises a web 20 and two flanges 21 and 22, the flanges being horizontal under the above-indicated conditions.

The web 20 is provided with small holes 23 for fixing the frame inside a cabinet or the like by means of screws, and it is provided with large holes 24 through which to pass cables or lines serving the various connection strips.

One of the flanges 21 is provided with a series of aligned slots 25. In this example, there are four slots, they are close to the edge of the flange, and they serve to mount and retain the hinge part. Preferably, the flange in question is the bottom flange.

The other flange 22 is provided with four locking notches 26 for locking the four connection strips. The notches are open on the edge of the flange, and they are cross-shaped. Flange 22 projects more than flange 21 relative to the web 20.

The hinge part 3 is described in more detail with reference to FIG. 1 and more particularly to FIGS. 3 to 6. It has substantially the same length as the frame.

Figure 3:
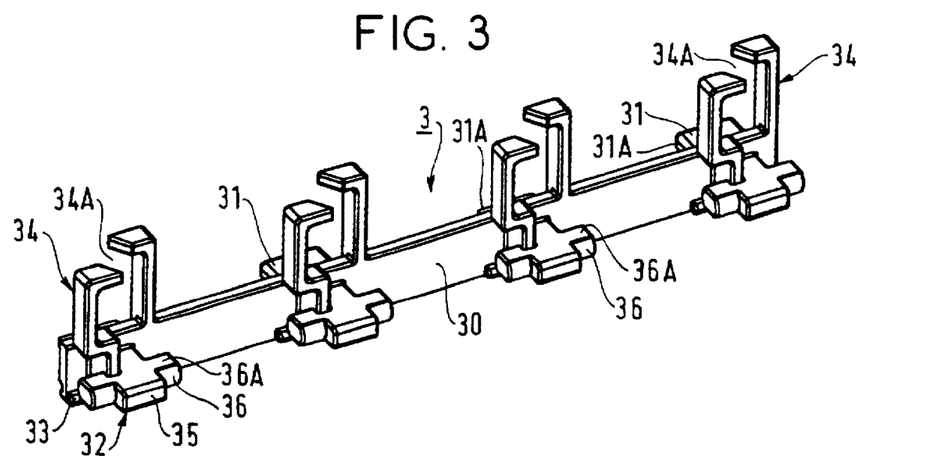
FIG. 3 is a perspective view of a hinge part for hinging the connection strips to the frame.
Figure 4:
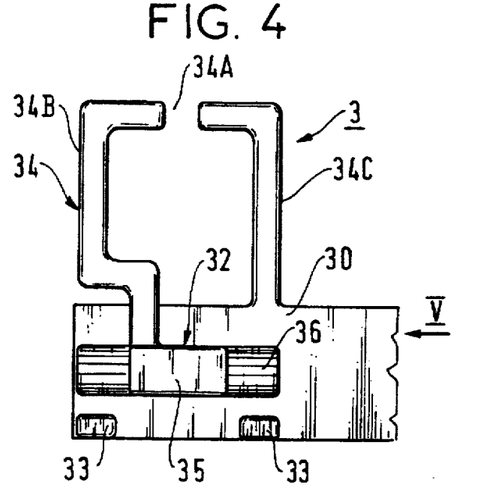
FIG. 4 is a fragmentary elevation view of the hinge part.
Figure 5:
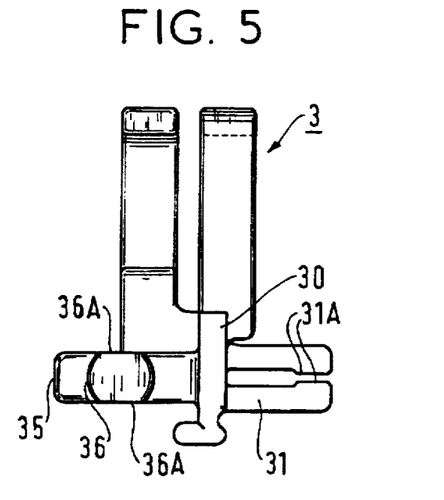
FIGS. 5 and 6 are a side view and a fragmentary underside view of the hinge part.
Figure 6:
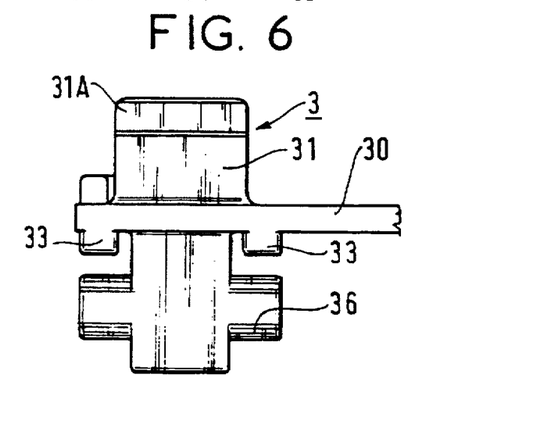

The part comprises a flat support part constituted by an uninterrupted bar 30 provided with a series of retaining catches 31, with four sets of hinges 32 for the respective connection strips, with four sets of abutments 33 for stopping the connection strips in their open positions, and advantageously also with four wire-receiving rings 34 for the respective connection strips.

The retaining catches 31 project from one of the faces of the bar, in positions corresponding to the series of rectangular slots in the bottom flange of the frame. The retaining catches are provided offset on alternate sides of the middle longitudinal axis of the face, so that they are received alternately against the outside face and the inside face of the bottom flange of the frame. Each of the retaining catches is provided with an end tooth 31A on its inside face, which tooth engages in one of the rectangular slots of the bottom flange of the frame.

The sets of hinges 32 comprise four arms 35 projecting from the other face of the bar 30 along the longitudinal axis thereof. Each arm is provided with two hinge fingers 36 extending in opposite directions from each other parallel to the longitudinal axis of the bar. The sets of hinges define the pitch of the connection strips on the hinge part and on the frame. The hinge fingers are semi-cylindrical, and each of them has two mutually opposite flats 36A to facilitate engaging the hinge bracket of each connection strip on the fingers and disengaging them therefrom, while the connection strip is in an intermediate position between its closed position and its open position on the frame.

The four sets of abutments 33 are constituted by pairs of small tabs projecting from the same face as the sets of hinges, and provided facing them, along an "outside" edge of the bar 30 as installed on the flange of the frame. Each pair of abutments 33 limits rotation of the connection strip about the corresponding pair of hinge fingers, by defining an open position substantially at 90° relative to the closed position. The pairs of abutments project to a relatively small extent from the bar 30 compared with the sets of hinges.

Each of the wire-receiving rings 34 is provided for the lines serving a respective one of the connection strips. They are provided at positions corresponding to the sets of hinges, while not being quite centered thereon so as to avoid obstructing rotation of the relevant connection strip, and they project along the "inside" edge of the bar as installed on the frame. Each of them has an opening 34A on its side further from the bar. Each of them is defined by two half-rings 34B and 34C which have in common that portion of the bar which is situated between them and which interconnects them. The two half-rings are offset relative to each other so that they do not quite face each other.

Figure 9:
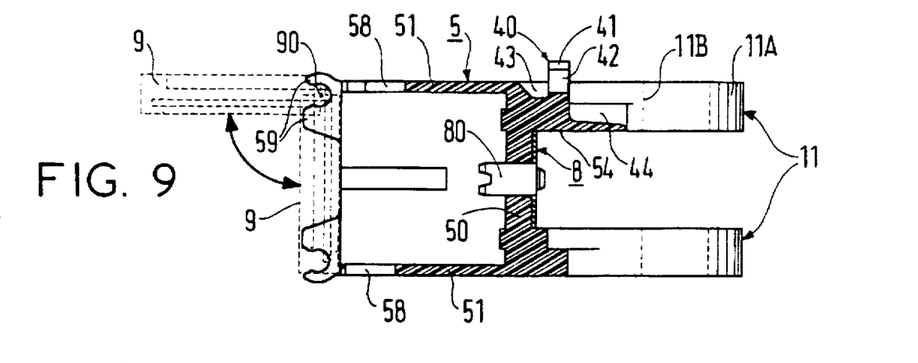
FIG. 9 is a cross-sectional view of the connection strip on line IX—IX of FIG. 8.

The connection strips 1 are also described with reference to FIG. 1 and more particularly to FIGS. 7 to 9, with respect to the cradle 5.

The cradle 5 is a channel-section cradle and it constitutes the peripheral portion of the connection strip. It carries the hinge brackets 11, the locking catches 12, the wire-receiving rear ring 14 and the wire-receiving end rings 13. It is further provided with a wire-guiding side comb 40 implemented on one side only, or in a variant on both sides, substantially along the rear portion of the cradle. The cradle is made by being integrally molded with the various elements with which it is provided.

The cradle has a web 50 and two side flanges 51. It is compartmentalized by means of transverse partitions 52 which interconnect its two flanges, and close its ends, and which define identical compartments 53 between them. Each of the compartments 53 other than the end compartment situated closer to the hinge 11 receives a respective one of the connection modules 6, each of which is equipped with two sets of contacts 7 in two rows. The end terminal situated closer to the hinge 11 receives the "grounding" module 6' which is of the same dimensions as the modules 6, but which is provided with two facing contacts 7 only. The modules 6 are lined up with one another and with the end module 6'. Their contacts are then in two rows, and they abut against abutments 50A provided in two rows on the inside face of the web 50 and projecting slightly therefrom.

The web 50 retains the grounding collector 8 on its outside face. For this purpose, the outside face of the web is provided with a middle recess 54 substantially over its entire length, with a series of narrow orifices 55 through its thickness and centered along the recess, and with a series of small circular projections 56 which are centered along the recess. Each of the orifices 55 opening out into a respective one of the compartments 53, in the vicinity of one of the partitions delimiting the compartment and parallel to the partition.

The wire-receiving rear ring 14 straddles the recess.

The comb 40 projects outwardly along one of the flanges 51, level with the web 50. The comb is formed by a series of teeth 41 delimiting circular notches 42 between them having narrow openings for the individual conductors and any screen wires from the lines serving the connection strip. A longitudinal groove 43 slightly deeper than the notches and open lengthwise in the notches is provided just in front of the comb.

A series of fins 44 projecting from the rear of the web is provided on the same side as the comb. The fins slope over the thickness of the corresponding edge of the recess and they define passages 45 between them for the lines serving the connection strip.

A row of internal indentations 57 is provided on each of the flanges 51 of the cradle 5 for retaining the modules 6 and 6' in the compartments 53.

Wire-guiding notches 58 are further defined in the flanges 51 along their edges, which notches are organized into successive sets of three notches, at positions corresponding to the successive compartments along the cradle.

Two hinge brackets 59 are further provided on at respective ends of the edge of each of the flanges 51 for hinging the cover 9 to the edge of either one of the two flanges 51. The cover is provided with two end hinge fingers 90 forming a hinge axis on one of its longitudinal edges, which fingers are engaged in the brackets 59. The cover is closed directly against the edge of the other flange of the cradle, and it may be locked to the edge of said other flange if so desired.

Each of the hinge brackets 11 for hinging the connection strip comprises a circular head 11A provided with a circular hole 11B having an opening 11C for resiliently mounting them on the hinge part for hinging the connection strips. The opening 11C is narrower than the distance between the flats provided on the hinge fingers of the part. The hole 11B is of substantially the same diameter as the fingers. A groove 11D is provided between each hinge bracket and the web 50, on that side of the bracket which is closer to the end of the connection strip, for receiving the corresponding abutment for limiting opening of the connection strip as hinged to the hinge part installed on the frame.

The locking catches 12 for locking the connection strip are integral with the web of the cradle, at its other end. They are folded back substantially on themselves towards said other end, so that each of them has an elastically deformable end portion 12A. They are interconnected via a bridge 12B between the facing edges of the end portions 12A. The bridge extends over a portion of the length of each of the end portions, substantially from the end of each of them, and it projects therefrom towards the end of the cradle. Its span is substantially equal to the width of the opening of the locking notches provided in the frame. As the connection strip comes into the closed position, the bridge engages in the opening of the locking notch while the end portions 12A press against the inside face of the flange of the frame on either side of the opening. The bridge relaxes inside the locking notch, once the end portions 12A themselves engage on either side in the same locking notch. The connection strip has then reached the closed position.

The closed connection strip can be unlocked by pressing on the bridge 12B so that the end portions 12A are released from the notch by elastic deformation.

It can also be noted that each of the almost end portions of the locking catches 12 forms a flat projection 12C delimiting a right-angled abutment shoulder 12D between the projection and the set-back end of each catch, and a sloping shoulder 12E on the other side of the projection. The sloping shoulders 12E force the projections 12C against the inside face of the flange of the frame until they engage in the locking notch, thereby preventing the connection strip from being free to open.

The grounding collector 8 is described with reference more particularly to FIGS. 10 to 13, or to FIGS. 8 and 9 with respect to mounting it on the cradle, and to FIG. 1 or 2 with respect to electrically connecting it to the frame.

Figures 10, 11:
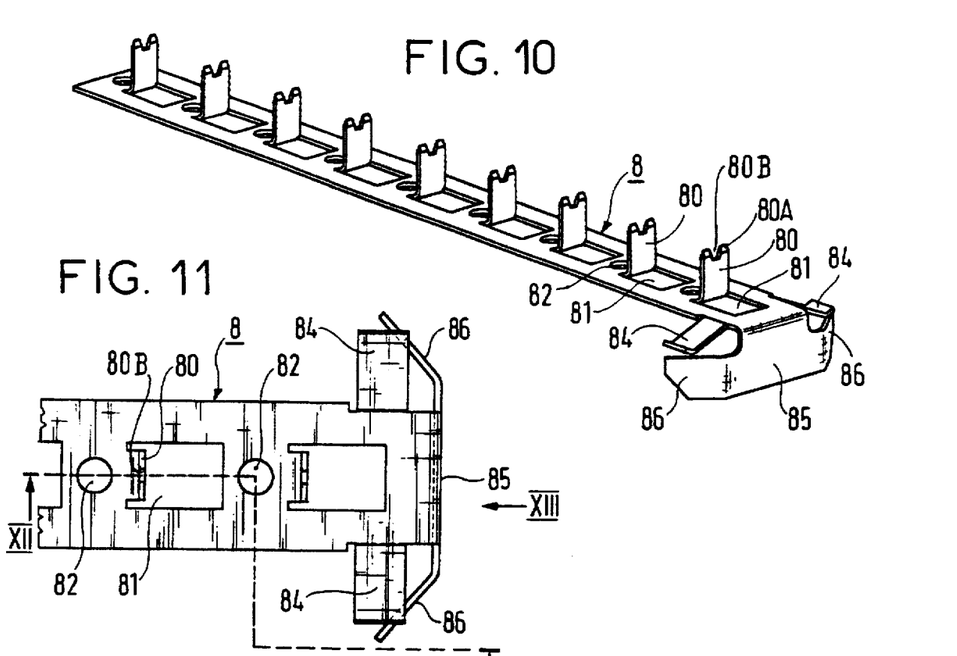
FIG. 10 is a perspective view of a grounding collector of the connection strip.
FIGS. 11 to 13 are a fragmentary plan view, a fragmentary longitudinal section view, and an end view of the grounding collector.
Figure 12:
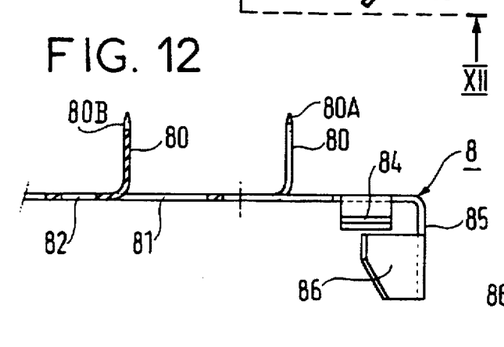

The grounding collector 8 is a metal bar which is received in the recess 54 on the rear of the web 50 of the cradle, and which is provided with a series of tongues 80 projecting from one of its faces. The tongues result from axial punched-out portions 81 provided in succession along the bar and folded at right angles to it. The positions of the tongues correspond to the narrow orifices 55 through the web of the cradle, in which orifices the tongues are engaged so that each tongue extends into a respective one of the compartments of the cradle.

The grounding collector is also provided with a series of circular holes 82 provided in alternation with the punched-out portions 81. The holes 82 receive the circular projections on the rear of the web, so as to hold the grounding collector in place on the web. The circular projections engaged in the holes 82 may be partially melted so as to reinforce holding of the grounding collector. The end 80A of each of the tongues is bevelled, preferably on both sides of the tongue, and it is provided with a middle notch 80B forming a point for receiving a test plug inserted from the front face of the connection strip.

Figure 13:
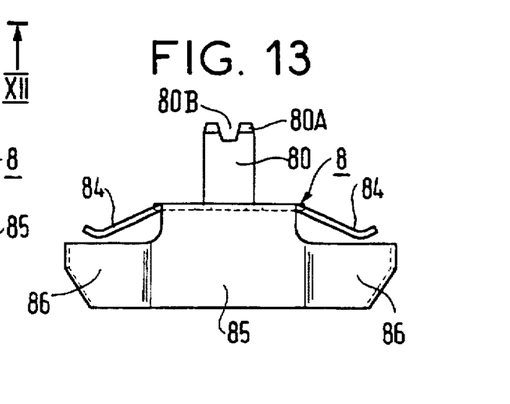

The end portion of the grounding collector, which portion is received on the hinged end of the connection strip, makes contact with the frame. Said end portion has two curved side tabs 84 for pressing resiliently against the edge of that flange 22 of the frame which has the locking catches, and an end tab 85 folded in the opposite direction to the tongues 80. The end tab 85 itself is provided with two side lugs 86 folded back inwardly on the tab 85 at substantially 120°. The two lugs engage slightly into the outside face of the flange of the frame on either side of the corresponding locking notch for locking the relevant connection strip, so as to make good electrical contact with the frame, which, in particular, may be made of aluminum.

Figure 16:
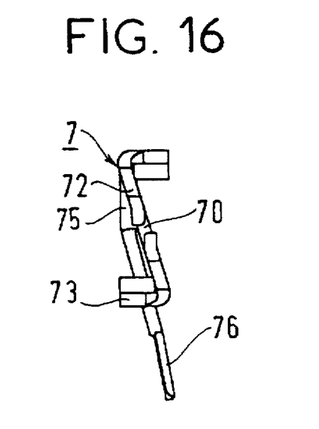
FIGS. 16 and 17 are a plan view and a side view of an insulation-displacement contact of the connection strip, or more precisely of one of its modules.
Figure 17:
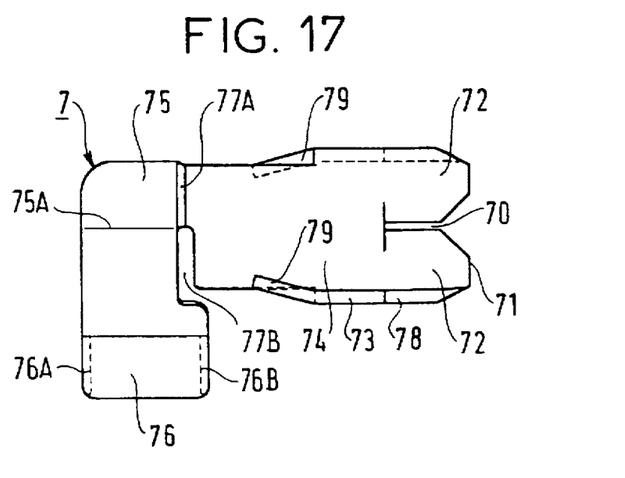

One of the modules 6 is described in more detail with reference more particularly to FIGS. 14 and 15, and one of the insulation-displacement contacts 7 is described with reference more particularly to FIGS. 16 and 17.

The module 6 includes a rectangular insulating body referred to as a "block" 60 which is either in one piece, or is in a plurality of assemblable-together portions. The module further includes two sets of contacts 7 in two rows in the block. In this example, each set of contacts comprises three facing contacts for connecting to a line or to a jumper, each line or jumper containing one pair of conductors and optionally a screen wire. Only two of the facing contacts are shown in the module shown in FIG. 14 to avoid cluttering and to facilitate understanding, the front portion of each of them being shown in cross-section so that they stand out better. It is also specified that one of the end pairs of facing contacts constitutes the pair of grounding contacts.

The block 60 is provided with two series of three recesses 61 that face one another from one series to the other, for the pairs of contacts 7. The recesses are delimited relative to one another by walls or partitions 62. Each recess is open over a "front" face and over the opposite "rear" face of the block.

Each recess is also open over both of the two opposite side faces along the series of recesses, in the front portion of the block, so as to define an inlet 63 for the conductor or for the screen wire to be connected to the installed contact. Each recess 61 further opens out directly in the facing recess of the other series, in the rear central portion of the block, so as to define a common window 64 in which the two contacts installed in the two recesses are resiliently interconnected. Between the front portion and the rear portion of the block, the intermediate portion 60A of the block is provided with two series of slots 65. Each slot 65 belongs to a respective one of the recesses and its shape matches the shape of the contact so as to position and hold the contact in the recess. In the front portion of the block, deflecting projections 66 are provided on one of the end portions of one of the walls 62 and on the other end portion of the other wall 62 delimiting each recess so that they project into the recess so as to hold the contact on a slant inside the recess.

The block 60 is further provided with a series of interrupting wells 67 between the two series of recesses. Each well is open over the front face of the block and opens out into the rear central window 64 communicating with the two facing recesses on either side of the well.

Figures 7, 8:
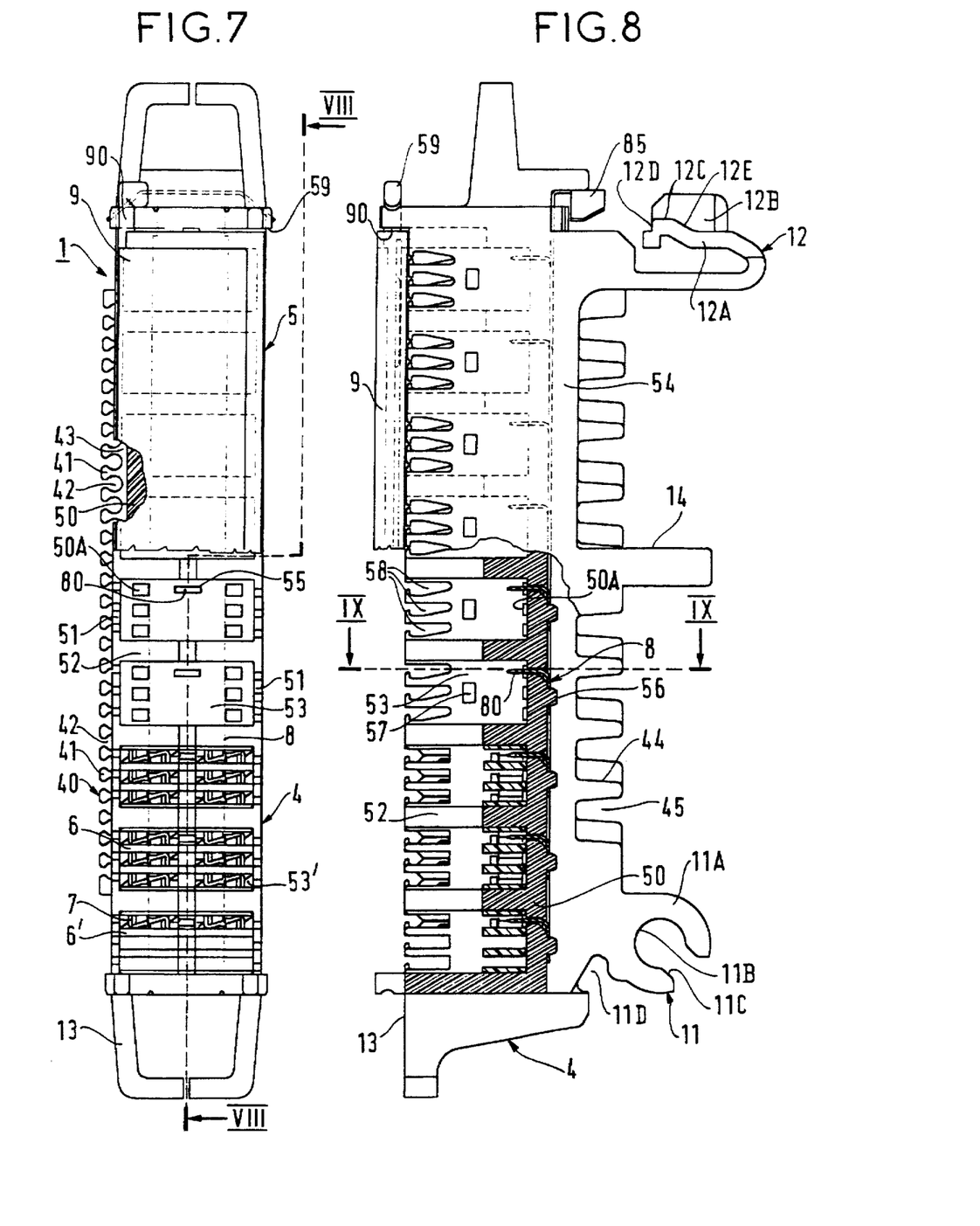
FIG. 7 is a plan view, part of which is cut-away, of one of the connection strips, showing the connection strip closed over a portion of its length and otherwise partially equipped.
FIG. 8 is a view partially in longitudinal section of the connection strip, on line VIII—VIII of FIG. 7.

The block is also provided with projecting lugs 68 centered on the two side faces along the two series of recesses, for holding the module in the cradle by being received in respective ones of the two corresponding inside side indentations 57 (FIG. 8). The block is further provided with two recesses 69 in its intermediate portion, namely one recess in each inside side of the Z-shaped slot 65 for retaining the insulation-displacement contact in place in its recess.

Compared with the module 6, it is indicated that the grounding module 6' includes two facing insulation-displacement contacts only such as the two end contacts shown in place in module 6.

It is also indicated that the module 6 may be made up of two assemblable-together portions, each of which portions then includes three insulation-displacement contacts, and the portions are assembled together along the series of interrupting wells, then defined in part on each portion. In a variant, the module 6 may be defined in three portions, each of which then includes two facing contacts, and the three portions are assembled together in succession.

All of the insulation-displacement contacts are identical, and each of them is constituted by a metal piece that is split axially over a portion of its length, that is cut out, and that is appropriately folded. They are received entirely in the recesses in the insulating body of the module so that they are set back slightly relative both to the front face and to the rear face of the block.

Each contact 7 is provided with an axial insulation-displacement slot 70 in its front portion, the slot having a V-shaped inlet at its front end 71. Each contact has two arms 72 on respective sides of the slot, which arms are folded parallel to the slot 70 in opposite directions so as to form two fins 73, thereby giving the contact a cross-section in the shape of a Z, which may be the right way round or back-to-front, in its front portion along the slot and slightly beyond in an intermediate portion 74 of the contact.

Beyond the intermediate portion, the contact includes a "rear" portion 75 having a resilient side tail 76 projecting from one side only of the contact for electrically connecting it to a facing other contact by being pressed thereagainst. The side tail forms a spring that is flat or, in a variant, slightly curved. The side tail is of slightly reduced thickness, and its two opposite edges 76A are bevelled.

The rear portion 75 is coupled via a side zone 77A deformed by folding or the like to that one of the two halves of the width of the intermediate portion 74 which is further from the resilient tail 76, while being rendered substantially transverse to the fins 73 along the zone 77A. Said portion is separated from the intermediate portion over the other half of the width thereof by a slot 77B, and it has an intermediate fold 75A parallel to and substantially opposite from the insulation-displacement slot 70. Along the separation slot 77B, the rear portion is substantially parallel to the intermediate portion 74 and to the arms 72, in the absence of any resilient stress being exerted on the tail 76, while being deformable and imparting considerable resilience to the coupling tail 76 for coupling the tail to the tail of the facing contact in the module, as shown in FIG. 14.

Figure 14:
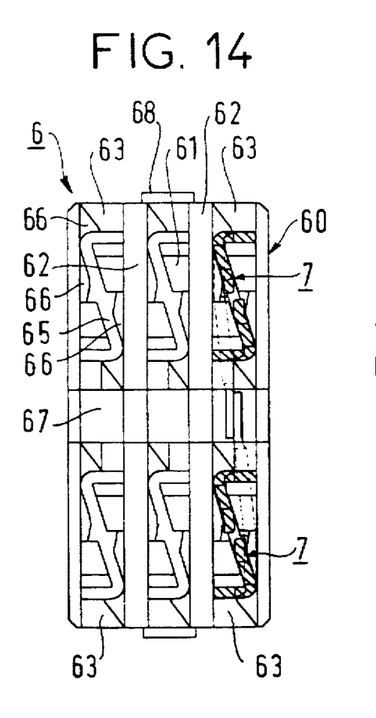
FIG. 14 is a plan view of a partially equipped connection module belonging to the connection strip.
Figure 15:
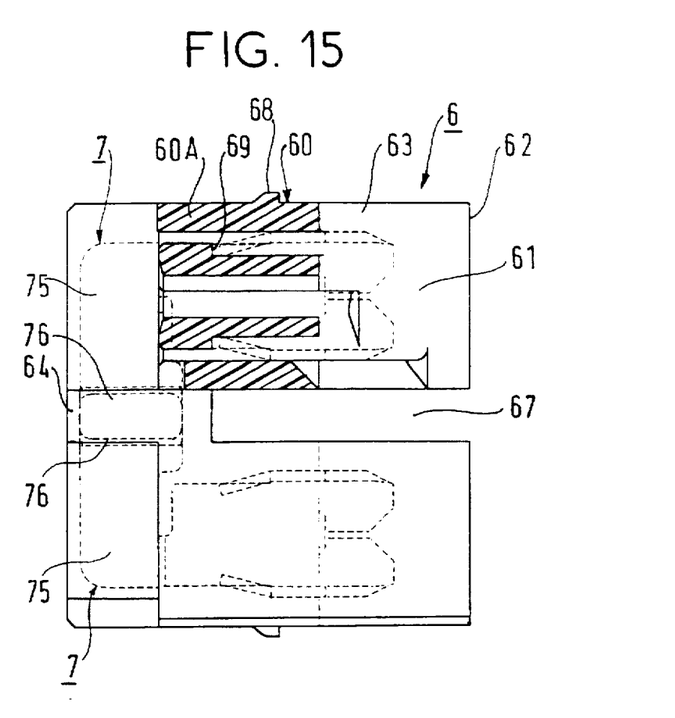
FIG. 15 is a side view partially in section of the module shown in FIG. 14.

With reference to FIG. 14 or 15 and to FIG. 8, it is easy to understand that the resilience of the coupling tails 76 of two facing contacts also makes it possible to engage them, by exerting pressure on them, on either side of the tongue of the grounding collector which projects into the compartment, so as to couple the tongue to the two grounding contacts of the module 6 or 6' installed in its compartment.

Each fin 73 of the contact 7 is provided firstly with a front end recess 78 which reduces the width of the fin and which receives a conductor or the screen wire that is connected in the insulation-displacement slot, and secondly a rear end catch 79 which locks the contact in the insulating block of the module. The contact is locked in the back of the recess 69 in the block on each side of the Z-shaped slot 65 (FIGS. 14 and 15) and also against the abutments 50A provided on the web of the cradle 5 (FIG. 8).

The modules designed to retain the contacts 7 so that they slant along each row in their recesses, and the small contacts that are Z-shaped in their front portions make it possible to mount the contact at a short pitch in each module 6 and therefore in each set along the two rows of contacts of the connection strip. By way of preferred example, the short pitch of the contacts in each set may be 2.54 mm, and the pitch of two contacts from one set to another may be about 5 mm, whereas the mounting pitch of the contacts along the rows in commonly used known connection strips is about 5 mm.

The resulting connection strip is therefore of small dimensions while also protecting the lines relative to one another so as to limit crosstalk between the connected lines, regardless of whether or not the lines are screened. When the lines are screened individually, the screen wire from each of them is connected directly to the corresponding grounding contact in each set. The end grounding module is used to connect its grounding contacts to the screen wire of the multi-line screened cable which serves the connection strip.

Figure 18:
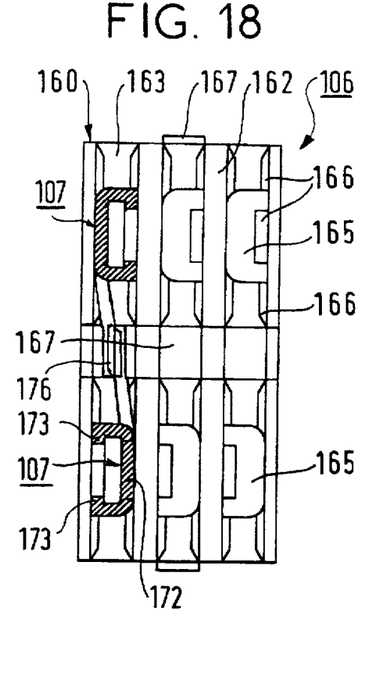
FIGS. 18 and 19 are two views corresponding to FIGS. 14 and 15 for a variant embodiment of the connection module.
Figure 19:
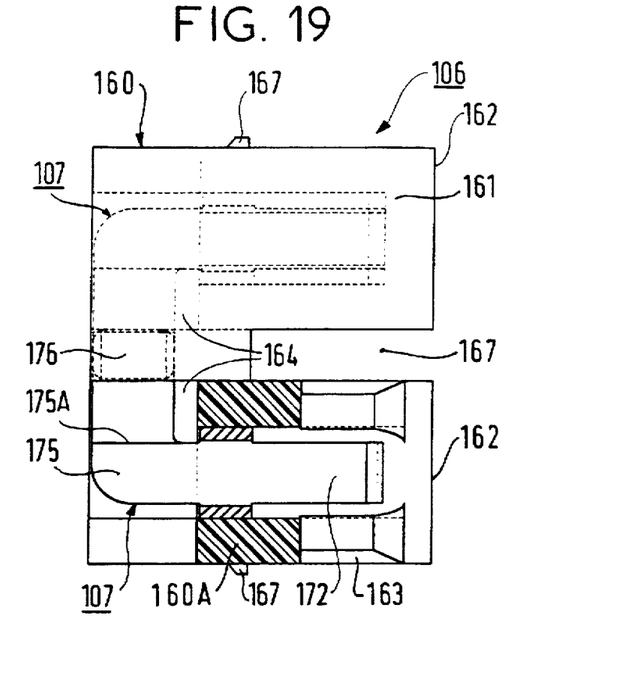

FIGS. 18 and 19 show a variant embodiment of the modules 6 or 6' of the connection strip, the variant modules being used instead of modules 6 or 6', and each variant module being designated by the overall reference 106.

The differences compared with the preceding modules result from the shape of their insulation-displacement contacts 107, and the way in which said contacts are mounted. The contacts are described in more detail with reference to FIGS. 20 and 21.

The module 106 includes a insulating body or block 160 analogous to that of the module 6, and on which the corresponding portions are referenced identically to the above-described portions, except that one hundred has been added to each reference. The differences are specified.

The slots 165 in the intermediate portion 160A of the insulating body are channel-section slots. The web of each slot is delimited against a respective one of the walls of the relevant compartment 161, and the flanges of the slot are perpendicular to the wall, and extend to the other wall. The deflecting projections 166 that project into the front portion of the compartment are rectilinear. Two of them are situated facing each other on respective sides of the conductor inlet 163, two other ones of them are situated facing each other at the opposite end of the compartment, and the last two of them are situated on the middle portion of the wall opposite from the web of the channel section of the slot 165.

Figure 20:
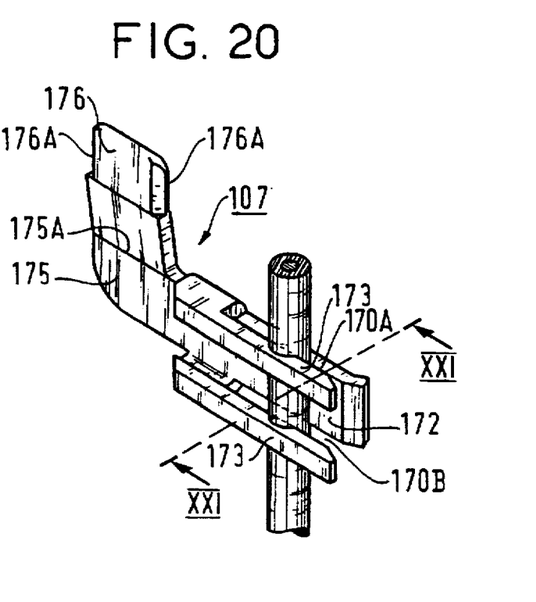
FIGS. 20 and 21 are a perspective view and a cross-sectional view of one of the insulation-displacement contacts of the module shown in FIGS. 18 and 19.
Figure 21:
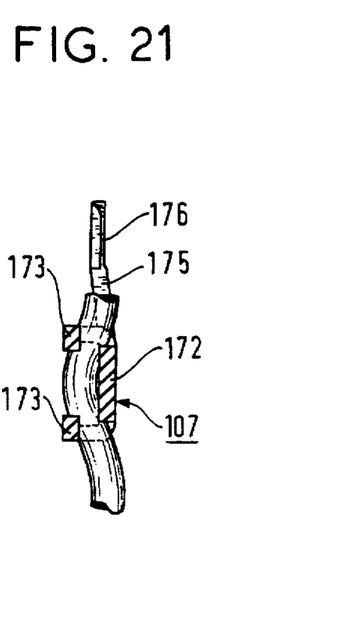

The insulation-displacement contact 107 has a front portion and an intermediate portion that are channel-section portions. The contact is provided with two side insulation-displacement slots 170A and 170B having V-shaped inlets. The insulation-displacement slots are provided between the web 172 and respective ones of the flanges 173. They extend from the front end, along the front portion, and substantially to midway along the intermediate portion, thereby separating the web from each of the flanges, each insulation-displacement slot having two inside edges that engage in the conductor inserted into both slots, as shown in FIG. 21.

The contact 107 also has a rear portion 175 which extends the web 172, which has a fold 175A substantially in alignment with one of the insulation-displacement slots, and which defines, beyond the fold, a projecting and resilient side tail 176 for coupling the contact to the facing contact in the module 106. The resilient tail is of reduced thickness and has bevelled edges 176A.

The contacts mounted in the various compartments of the module are perpendicular to each row defined in the module and in the resulting connection strip. The advantages obtained are those indicated above with reference to the contacts 7, to the modules 6 or 6', and to the resulting connection strip.

We claim:

1. In a connection strip for high data rate lines including an elongate insulating body, two rows of insulation-displacement contacts mounted in the body facing one another, means interconnecting electrically said insulation-displacement contacts in pairs from one row to the other inside said insulating body, said contacts defining successive sets along each row, said contacts of each set in one of the rows being assigned to one of the lines and constituting at least one end grounding screen in the set, the improvement wherein, in each set of contacts, said connection strip includes a single one of two end contacts constituting a single grounding screen and forming a grounding contact, and a ground collector extending along said body, connected to an external ground, and provided with a plurality of longitudinally spaced tongues making electrical connection with respective facing grounding contacts in said two rows, inside said body.

2. A connection strip according to claim 1, wherein said insulation-displacement contacts mounted in the body have a first pitch between said contacts in each set, and a second pitch, that is greater than the first pitch, from one of the sets to the next in each row.

3. A connection strip according to claim 2, wherein said insulation-displacement contacts are mounted along each row, with a first pitch having a given value lying substantially in the range 2.5 mm to 5 mm, and a second pitch having a value of about 5 mm.

4. A connection strip according to claim 2, wherein said insulating body comprises an elongate channel-section cradle having a web and two side flanges, and receiving connection modules, each module being formed of a rectangular insulating block equipped with two sets of said facing contacts.

5. A connection strip according to claim 4, wherein said cradle is provided with a series of transverse partitions dividing said cradle into compartments, and separating said connection modules from one another when they are installed in the cradle.

6. A connection strip according to claim 5, wherein each insulating block has front and rear opposite first faces and side opposite second faces, and is provided with two series of internal recesses, facing one another from one series to the other, for the facing contacts of said two sets, said recesses being open firstly over said respective front and rear opposite first faces of the block, and secondly via respective inlets in front portions of respective side opposite second faces of the block, each recess further opening out in the facing recess of the other series via a common window provided in a rear central portion of said block in which two facing contacts are electrically connected to each other and are connected to one of the tongues on said grounding collector when said two facing contacts are grounding contacts of the two sets.

7. A connection strip according to claim 6, wherein each insulating block is further provided with a series of interrupting wells provided between the facing recesses of the two series, each of said wells opening out in the front face and in one of the windows of the rear central portion of said block.

8. A connection strip according to claim 7, wherein the block is constituted by at least two assembled portions each portion of which is provided with one of two sets of contacts or facing contacts of the two sets.

9. A connection strip according to claim 7, further including a grounding module mounted in one of the two ends of the cradle, the grounding module being analogous to the connection modules, and being provided with two facing insulation-displacement contacts only.

10. A connection strip according to claim 6, wherein each of said insulation-displacement contacts includes an axially-split front first portion of substantially Z-shaped cross-section, received so that said first portion slants relative to the row of contacts in a front portion of the compartments in each module, and an opposite rear second portion coupled to a resilient side tail projecting from one side of the first portion only, and wherein two side tails of two contacts in place in facing recesses bear resiliently against each other in the rear central portion of each connection module, and clamping one of the tongues of the grounding collector therebetween when the two contacts are grounding contacts.

11. A connection strip according to claim 10, wherein said contacts are provided with a resilience-imparting slot for said side tail, and said slot extends from said side tail between the rear portion and a non-split intermediate portion of said contact.

12. A connection strip according to claim 6, wherein each of said insulation-displacement contacts includes a channel-section front portion defining a web and two side flanges, and extending perpendicularly to the row of contacts, in a front portion of said module, and a rear portion coupled to the web and to a resilient side tail projecting from one side of said contact only, so that said contact may be resiliently connected to the tail of the facing contact in the module, and each of said insulation-displacement contacts includes two insulation-displacement slots between said web and respective ones of the side flanges of said front portion.

13. A connection strip according to claim 5, wherein said grounding collector is a metal bar received and retained longitudinally on a rear of the web of said cradle, said tongues on the collector project from one face thereof and being received in the rear central portions of the various modules in place in the cradle, via orifices provided in corresponding positions in the web of the cradle, and said collector has at least one end thereof connected to a metal frame connected to the external ground.

14. A connection strip according to claim 13, wherein said grounding collector includes two curved side tabs on a first one of its ends, an end tab folded over at the first end, facing the other face of the bar, and two side lugs folded back on the end tab towards the bar for electrically connecting said grounding connector to said metal frame connected to said external ground.

15. A connection strip according to claim 13, further including at least one hinge bracket and at least one opposite locking catch, said hinge bracket and said locking catch projects from the rear of the web of the cradle, substantially at respective ones of its ends, to hold the connection strip in the frame.

16. A connection strip according to claim 15, including two locking catches provided side-by-side and secured to a first one of the ends of the web of the cradle, each catch having a resilient end portion, and both catches carrying a common intermediate bridge projecting outwardly from the end portions of said locking catches and connected to their facing edges.

17. A connection strip according to claim 13, wherein said cradle is outwardly provided with at least one guide element constituted from among a wire-receiving rear ring, a rear series of line-guiding rear fins, a wire-guiding side comb, a front series of wire-guiding notches, and at least one wire-receiving end ring.

18. A connection strip according to claim 17, including a cover hinged about the edge of one of the side flanges of the cradle.

19. A connection strip assembly comprising a plurality of connection strips according to claim 15 on said frame, and wherein said frame is a channel-section frame comprising a web and two flanges, and wherein said assembly includes a hinge part removably mounted on the edge of a first one of the flanges of the frame, and wherein a second flange of the frame is provided with locking notches for said connection strips.

20. An assembly according to claim 19, wherein said locking notches are cross-shaped.

21. An assembly according to claim 19, wherein said hinge part includes a flat elongate support carrying retaining catches projecting from a first one of the faces of the support, each of said catches is provided with a fastening end tooth, the flat elongate support also carrying at least one support arm projecting from the second face of the support and provided with two opposite hinge fingers, said fingers being parallel to a middle axis of said support, and wherein the first flange of the frame is provided with slots along one edge thereof for receiving teeth of respective retaining catches.

22. An assembly according to claim 21, wherein said hinge fingers have two opposite flats on peripheries thereof.

23. An assembly according to claim 20, wherein said retaining catches are offset in alternation on one side and on the other of the middle axis of said support, and an end tooth on each retaining catch facing towards the middle axis.

24. An assembly according to claim 20, wherein said hinge part further includes abutments projecting from said second face of said support provided substantially along an outer edge of the support as installed on said first flange of the frame facing the hinge fingers of each connection strip to limit opening of the corresponding connection strip on the frame.

25. An assembly according to claim 20, wherein said hinge part includes at least one wire-receiving inner ring projecting laterally and formed an inner edge of the support as installed on said frame.

* * * * *